(Model.)

D. SCHOENTHALER.
Trace-Buckle.

No. 228,124.        Patented May 25, 1880.

Chas. J. Buchheit.
Edw. J. Brady.
   Witnesses.

D. Schoenthaler   Inventor.
By Wilhelm & Bonner,
           Attorneys.

UNITED STATES PATENT OFFICE.

DANIEL SCHOENTHALER, OF WILLIAMSVILLE, ASSIGNOR OF ONE-HALF OF HIS RIGHT TO HARVEY D. BLAKESLEE, OF BUFFALO, NEW YORK.

TRACE-BUCKLE.

SPECIFICATION forming part of Letters Patent No. 228,124, dated May 25, 1880.

Application filed March 16, 1880. (Model.)

*To all whom it may concern:*

Be it known that I, DANIEL SCHOENTHALER, of Williamsville, in the county of Erie and State of New York, have invented a new and useful Improvement in Trace-Buckles, of which the following is a specification, reference being had to the accompanying drawings.

The object of my invention is to produce a cheap and simple trace-buckle composed of two parts, each of which is readily cast complete, and which are easily put together, forming a buckle in which the tongue is substantially relieved from the strain of the trace, and which can be readily opened when required.

My invention consists of a trace-buckle composed of a bail which is attached to the hame-tug and provided with a fixed tongue, and a buckle-frame pivoted to the rear end of the bail, which is loosely connected with a trace, as will be hereinafter fully set forth.

Figure 1:
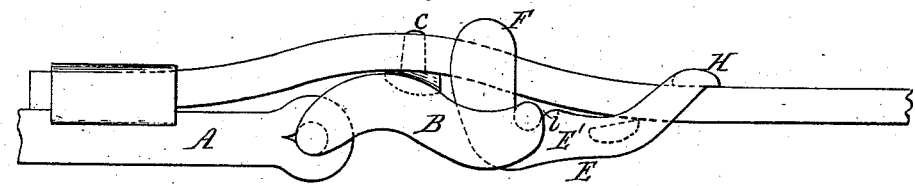
Figure 2:
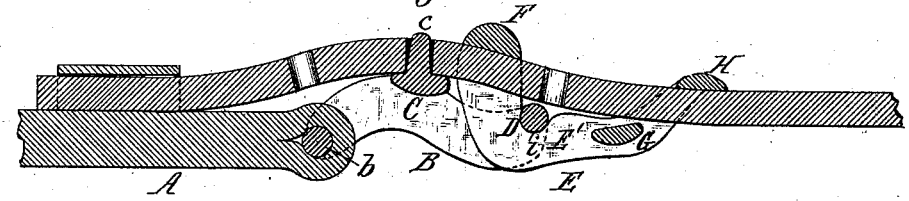
Figure 3:
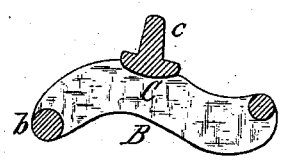
Figure 5:
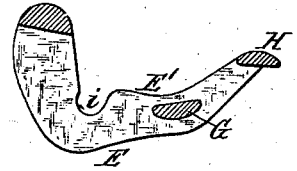
Figure 4:
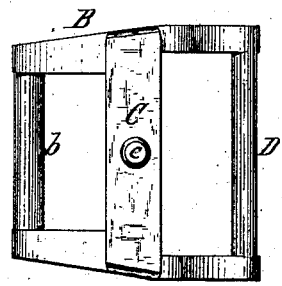
Figure 6:
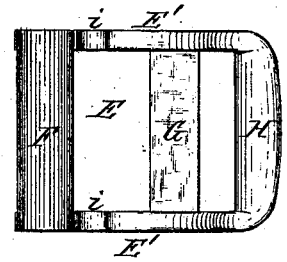

In the accompanying drawings, Figure 1 is a side elevation of my improved buckle. Fig. 2 is a longitudinal section thereof. Fig. 3 is a longitudinal section of the bail. Fig. 4 is a plan view thereof. Fig. 5 is a longitudinal section of the buckle-frame. Fig. 6 is a plan view thereof.

Like letters of reference refer to like parts in the several figures.

A represents the hame-tug, and B the bail of the buckle, provided at its front end with a cross-bar, $b$, to which the hame-tug A is attached.

C represents a flat cross-bar, arranged near the middle of the bail B, and provided with a fixed tongue, $c$.

D is a round cross-bar connecting the rear ends of the side bars of the bail.

E is the buckle-frame, which is loosely attached to the trace, and which consists of side bars, E' E', and cross-bars F, G, and H. The buckle-frame E is made of such width that the side bars, E', of the same will fit between the side bars of the bail B. The forward ends of the side bars, E', of the buckle-frame are turned up, so as to project upward between the middle cross-bar, C, and the rear cross-bar, D, of the bail. The upper ends of these upturned front portions of the side bars, E', of the buckle-frame are connected by the cross-bar F.

$i$ are recesses or seats formed in the side bars, E', of the buckle-frame for the reception of the rear cross-bar, D, which is held in these recesses or seats, and forms a fulcrum on which the buckle-frame swings. The rear ends of the side bars, E', of the buckle-frame are also turned up and connected by the cross-bar H, while the cross-bar G is arranged between the depressed portions of the side bars, E', of the buckle-frame and forms the bed against which the trace rests, the space between the cross-bar G and the bars F and H being sufficiently high to permit the insertion of a trace of the proper thickness.

Said loops may be formed on the bail B, or on the buckle-frame E, as may be preferred.

The bail B and the buckle-frame E are each cast complete, and the two parts are connected by simply placing the rear bar, D, of the bail in the recesses $i$ of the frame E. The trace is passed through the frame E and engaged with the tongue $c$, as shown in Figs. 1 and 2.

When a draft is applied to the trace the forward end of the buckle-frame E is swung inwardly against the trace, thereby pressing the front cross-bar, F, against the trace, clamping the latter between the bar F and the bar C of the bail, and releasing the tongue $c$ to a great extent from the strain of the trace.

The buckle is readily opened upon pushing the trace back.

My improved buckle is very simple and durable in construction. It is cheaply manufactured, as no fitting or riveting is required, and very convenient in use.

I claim as my invention—

1. A trace-buckle composed of a frame, E, having its front portion bent upwardly, and provided with a cross-bar, F, and a bail, B, provided with a front cross-bar, $b$, to which the hame-tug is attached, and a cross-bar, C, arranged in front of the buckle-frame E, and provided with a fixed tongue, c, the bail being pivoted to the buckle-frame in the rear of the raised front portion of the latter, substantially as set forth.

2. The combination, with the bail B, provided with cross-bar C, having tongue c, and rear cross-bar, D, of the buckle-frame E, having cross-bars F, G, and H and recesses i, substantially as set forth.

DANIEL SCHOENTHALER.

Witnesses:
   JNO. J. BONNER,
   CHAS. J. BUCHHEIT.